No. 662,950. Patented Dec. 4, 1900.
C. A. LONG.
THRESHING MACHINERY.
(Application filed Feb. 16, 1899. Renewed Oct. 29, 1900.)
(No Model.) 3 Sheets—Sheet 1.
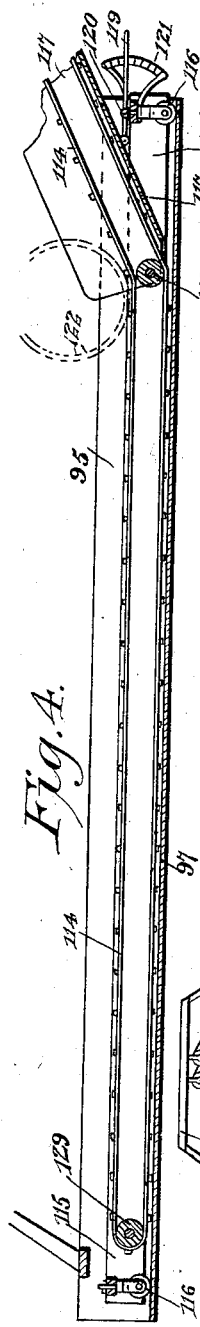
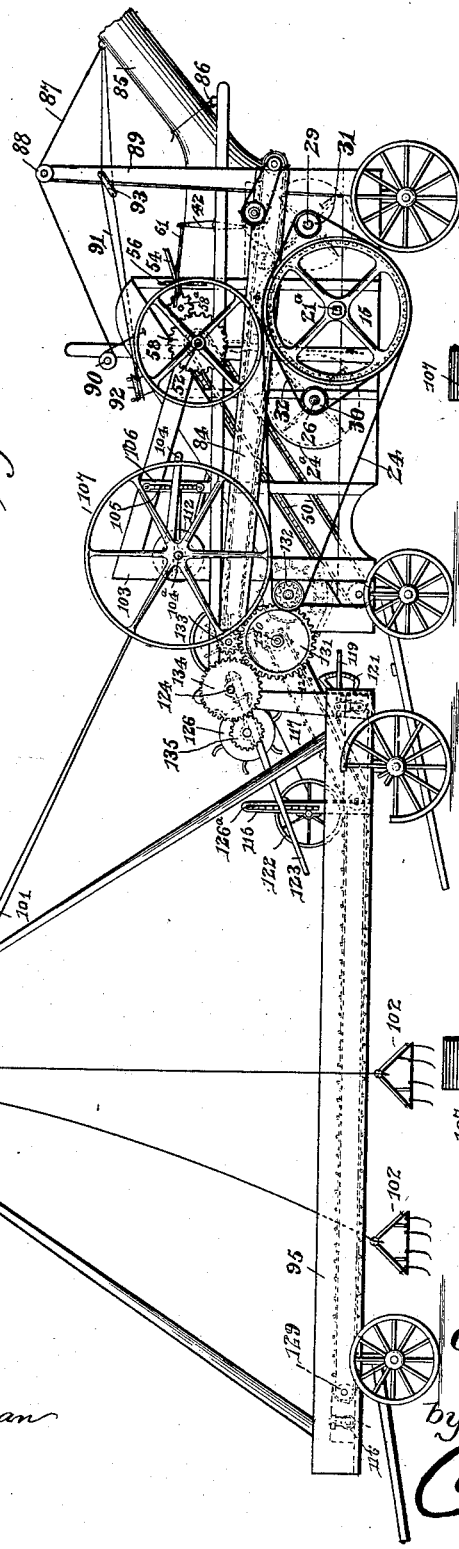
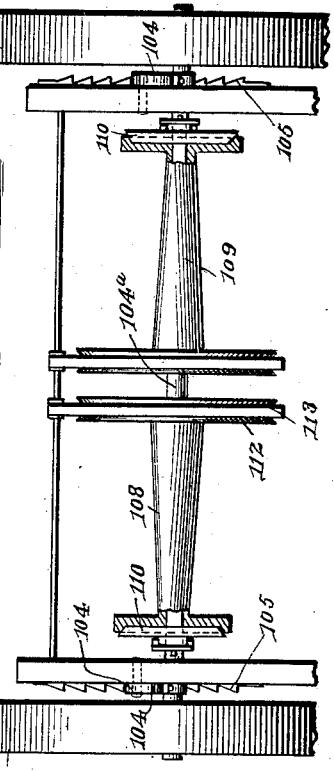
Witnesses.
Jas. K. McCathran
H. J. Bernhard
Charles A. Long
Inventor.
by
attys.
THE NORRIS PETERS CO., PHOTO-LITHO., WASHINGTON, D. C.

No. 662,950. Patented Dec. 4, 1900.
C. A. LONG.
THRESHING MACHINERY.
(Application filed Feb. 16, 1899. Renewed Oct. 29, 1900.)
(No Model.) 3 Sheets—Sheet 2.
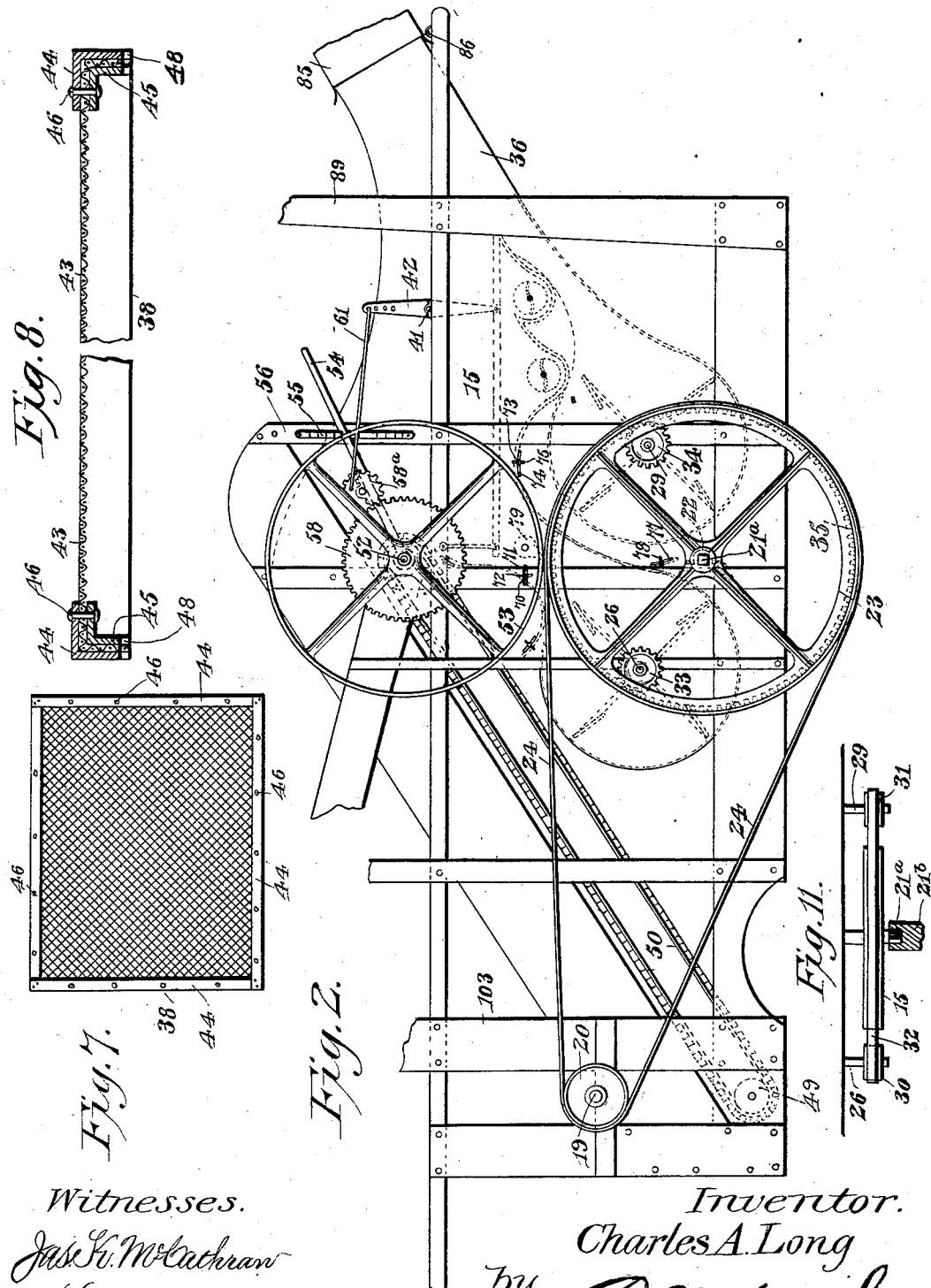
Witnesses.
Inventor.
Charles A. Long
by
attys.

No. 662,950. Patented Dec. 4, 1900.
C. A. LONG.
THRESHING MACHINERY.
(Application filed Feb. 16, 1899. Renewed Oct. 29, 1900.)
(No Model.) 3 Sheets—Sheet 3.
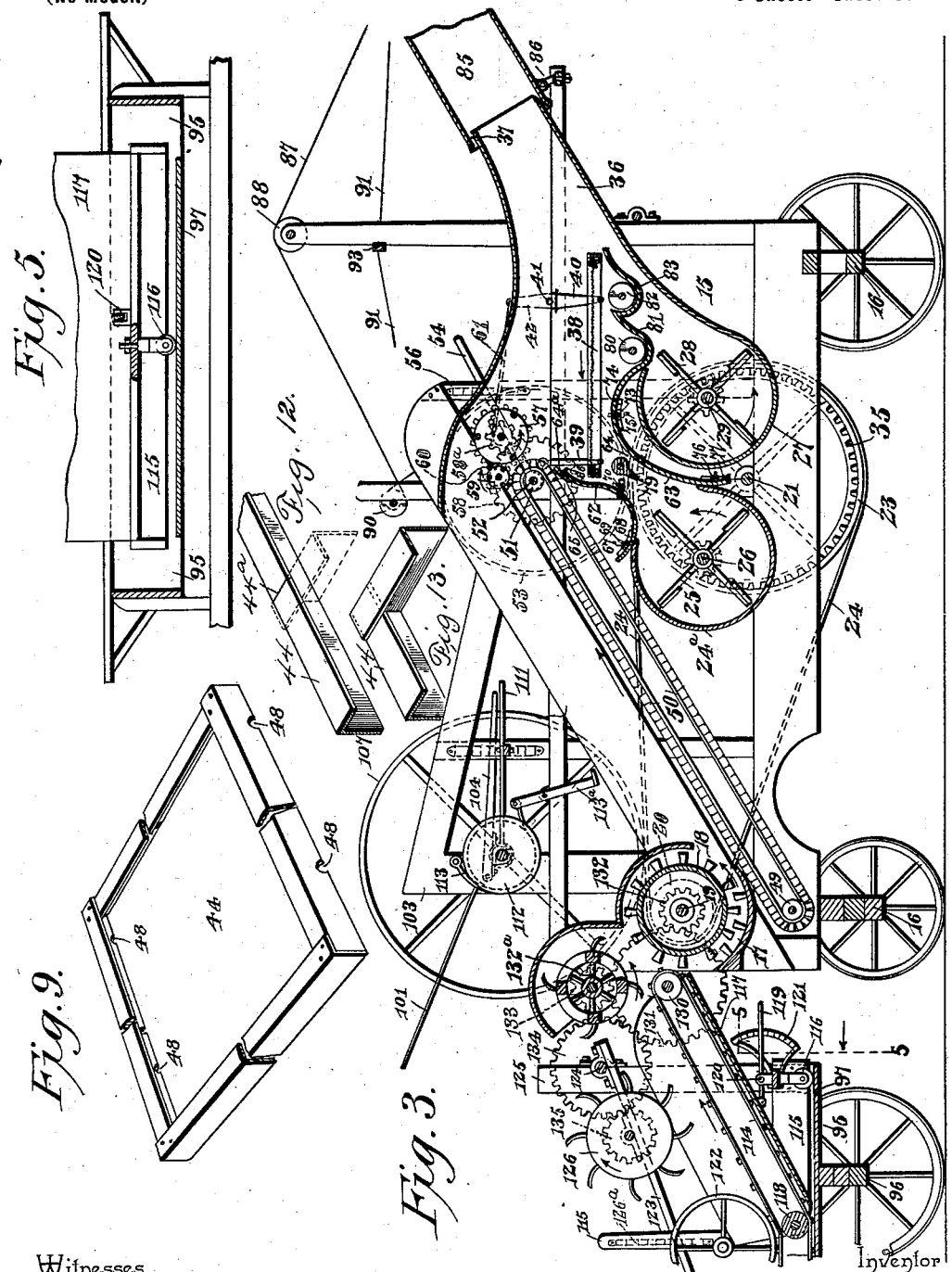
Witnesses
Jas. K. McCathran
H. J. Benkert
By his Attorneys, C. A. Snow & Co.
Inventor
Charles A. Long

UNITED STATES PATENT OFFICE.

CHARLES ALBERT LONG, OF POMEROY, WASHINGTON.

THRESHING MACHINERY.

SPECIFICATION forming part of Letters Patent No. 662,950, dated December 4, 1900.

Application filed February 16, 1899. Renewed October 29, 1900. Serial No. 34,800. (No model.)

*To all whom it may concern:*

Be it known that I, CHARLES ALBERT LONG, a citizen of the United States, residing at Pomeroy, in the county of Garfield and State of Washington, have invented a new and useful Threshing-Machine, of which the following is a specification.

My invention relates to improvements in threshing-machines by which I am able to produce a structure of simple and durable construction possessing a high degree of efficiency and which is not liable to get out of working condition, so as to require constant repairs during the threshing season.

One object of the invention is to construct the threshing-machine with means for controlling the energy and direction of the blast from one fan of the machine upon the shaking riddle or screen, so as to fill the entire throat leading from the fan to said riddle and direct the blast against the straw and chaff in a manner to prevent lodgment thereof upon the riddle and to carry the same to the stacker-tube, where the straw and chaff meet the blast from the stacker-fan, so that the two currents or blasts from the riddle-fan and the stacker-fan unite to carry the straw through the stacker-tube. While this operation of eliminating and discharging the straw is being effected, the grain is thrown or delivered upon the riddle and across the path of the blast from the riddle-fan in order to expose the grain to the action of said blast for the elimination of the chaff. The carrier and beater devices and the riddle-fan are so controlled and arranged as to subject the grain to a winnowing action and overcome the tendency of the grain and chaff to lodge in a mass or accumulate in a heap on the riddle, thereby treating the grain in a manner for the blast to sift through the falling grain and blow away the chaff and straw.

A further object of the invention is to provide an improved construction of the riddle by which the screen or foraminous material is clamped and confined within a frame to conceal the rough or uneven edges thereof and make the sides of the frame present a smooth appearance, whereby the riddle is adapted to play freely in the machine-casing, and it is not liable to catch and detain the straw and chaff. The improved riddle is suspended for easy removal, and its construction is of such a substantial nature as to withstand the service to which it may be exposed, thereby minimizing the necessity for repairs to the riddle.

A further object of the invention is to provide improved means for the propulsion of the threshing-cylinder, the riddle-fan, and the stacker-fan from a single source of power and to arrange the transmitting-gearing in duplicate on the respective sides of the machine with a view to reducing the strain unequally and to insure a high degree of efficiency of the several operative elements entering into the construction of the apparatus.

With these ends in view the invention consists in the novel combination of instrumentalities and in the construction and arrangement of parts, which will be hereinafter fully described and claimed.

To enable others to understand the invention, I have illustrated the preferred embodyment thereof in the accompanying drawings, forming a part of this specification, and in which—

Figure 1 is a side elevation of a threshing-machine constructed in accordance with the principles of my invention and with the feeder and fork mechanisms in operative relation thereto. Fig. 2 is a side elevation, on an enlarged scale, of a part of the threshing-machine, showing another form of gearing from the master-wheel to the riddle and stacker-fans and illustrating by dotted lines the said fans, the riddle, and the wind-deflectors. Fig. 3 is a longitudinal sectional view of the machine illustrated by Fig. 2 and showing a part of the feeder-conveyer and its operative devices in active relation to the mouth of the threshing-machine. Fig. 4 is a detail view, in longitudinal section, of a part of the feeder-conveyer. Fig. 5 is a vertical transverse sectional elevation on the plane indicated by the dotted line 5 5 of Fig. 3 looking in the direction of the arrow. Fig. 6 is a detail view, in side elevation, partly in section, of the driving-shaft for the fork mechanism and showing the independent fork-cable spools, with the clutches and the brake devices for said spools. Fig. 7 is a plan view of the improved riddle. Fig. 8 is an enlarged sectional view of the riddle shown by Fig. 7.

Fig. 9 is a detail perspective view of one of the companion members forming a part of the riddle-frame. Fig. 10 is a detail view of the gearing between the primary and auxiliary beaters, which are situated adjacent to the delivery end of the inclined endless conveyer or apron between the threshing-cylinder and the riddle. Fig. 11 is a detail plan view showing the means for propelling the power-driven jack-wheel. Figs. 12 and 13 are detail views showing the construction of one of the sections of the flat riddle-frame.

The same numerals of reference are used to indicate corresponding parts in each of the several figures of the drawings.

The frame or casing 15 of my threshing-machine may be of any suitable form, dimensions, and construction preferred by a mechanic skilled in the art to which this invention relates, and said casing is mounted on wheeled axles 16 in the usual manner to adapt the entire threshing-machine to be transported, as will be readily understood.

At the mouth of the threshing-machine I provide an ordinary concave 17, which may be of the usual or any preferred construction, and over this concave is disposed the spiked or toothed threshing-cylinder 18, the shaft 19 of which is journaled in suitable bearings on the frame or casing 15. The ends of the threshing-cylinder shaft are extended beyond the sides of the casing 15, and to said shaft are secured the driving-pulleys 20.

The power required for the operation of the threshing-cylinder and the several elementary parts of the entire threshing-machine is applied to the main driving-shaft 21, which is arranged in a horizontal position transversely across the machine below the shaking-riddle, and said shaft is journaled in bearings 22, which are secured to sills of the frame or casing 15, the ends of the shaft 21 being extended beyond opposite sides of the casing. To the extended ends of the main driving-shaft 21 are secured the master or jack wheels 23, which lie outside of the casing 15 and which may be constructed in the form of band-wheels for the reception of belts adapted to propel the threshing-cylinder. The main driving-shaft 21 has one end thereof extended beyond the jack-wheel, and it is made square or polygonal, as at $21^a$, (see Figs. 2 and 11,) and to said extended end of the shaft 21 is coupled a "tumbling-shaft" $21^b$, (see Fig. 11,) which tumbling-shaft is adapted to be driven in any suitable way from a traction-engine or a horse-power mechanism. The master-wheels 23 are represented in Figs. 1 and 2 in the form of pulleys with smooth exterior surfaces, and around said master-wheels pass the driving-belts 24, which encompass the pulleys 20 on the shaft of the threshing-cylinder, whereby the master-wheels are adapted, through the intermediate gearing, to rotate the threshing-cylinder.

Within the casing 15 and in advance of the main driving-shaft is secured the casing $24^a$ of the riddle-fan 25. This fan may be of any ordinary construction, having a shaft 26, which is extended or prolonged beyond the sides of the casing 15. In rear of the riddle-fan is arranged the casing 27 of the stacker-fan 28, said stacker-fan having a shaft 29 extended beyond the sides of the casing 15 in a manner similar to the shaft of the riddle-fan. The shafts of the two fans are arranged in close relation to the master-wheels 23 for the purpose of gearing the two fan-shafts directly to the master-wheels, whereby the master-wheels are made to operate the threshing-cylinder, the riddle-fan, and the stacker-fan by direct gearing. In Fig. 1 of the drawings the shafts 26 29 of the fans are arranged to lie externally to the master-wheels, and on the two shafts are secured the pulleys 30 31, which are engaged by the belts 32, that are driven by the master-wheels 23. I do not, however, desire to limit myself to the use of belt-and-pulley gearing, because I am aware that the fan-shafts 26 29 may be driven from the master-wheels by other kinds of gearing, and in Figs. 2 and 3 of the drawings I have represented the fan-shafts as being operatively connected with the master-wheels by spur-gearing. In this embodiment of the invention the fan-shafts 26 29 are arranged to lie in planes within the circular outline of the master-wheels, and to these ends of said fan-shafts are secured the pinions 33 34, which are arranged to mesh directly with the internal gears 35 of said master-wheels.

In the construction of the frame or casing of the primary or threshing machine I employ a wind-trunk 36, forming substantially a part of the casing 15. This wind-trunk may be constructed of metal, and its end next to the machine-casing 15 is fashioned or enlarged to embrace the rear end of the casing 15, said trunk having its opposite end tapered to form the contracted delivery-mouth, to which is loosely connected or fitted the lower end of the adjustable stacker-tube, which will be hereinafter described.

In the construction of my threshing-machine I do not find it necessary to employ a shoe with a series of riddles or screens nor to embody as a part of the machine a straw-carrier or rake mechanism. My machine contemplates the employment of a single shaking-riddle 38, which is suspended in a horizontal position above the main driving-shaft 21 and the stacker-fan 28. The shaking-riddle is suspended at its front end by means of a vertical front bail 39, which is pivotally attached to the machine-casing 15, as indicated by dotted lines in Figs. 2 and 3 of the drawings. The rear end of the shaking-riddle 38 is fitted operatively to the rear bail 40, arranged in a vertical position within the wind-trunk 36. This rear bail is pivoted at a point intermediate its length, as at 41, to the machine-casing 15, and said bail is extended upwardly from the pivotal point of suspension to form the arms 42, to which may be connected the pitmen that are driven by the primary beater, whereby the necessary shaking motion is given to the riddle. I contemplate the employment of a riddle which shall be simple and durable in construction and which will afford protection to the edges of the screen fabric or other foraminous material, so as to prevent the rough or uneven edges of said fabric from being exposed, thus reducing the tendency of the straw and chaff to lodge on the riddle. The riddle consists of a sheet of wire fabric or perforated metal 43 and a frame which is adapted to firmly clamp the edges of the fabric 43. This frame of the riddle comprises companion members 44 45, one of which is smaller than the other, so as to be fitted compactly or snugly within the larger frame member, as shown by Fig. 8. Each member of the frame is made from a length of angle metal, preferably steel, and in the construction of this frame member the horizontal flange of the angular metal is slitted or cut at intervals, as at 44$^a$, after which the vertical flange of the length of metal is bent at the several places where the horizontal flange is slitted, thereby forming the corners and sides of the frame. In bending the angular metallic bar in the manner described the horizontal flanges of said bar overlap at the corners of the frame member, and these horizontal flanges are united firmly together at the points where they overlap by means of rivets 46, as indicated by the plan view, Fig. 7. In assembling the parts of the riddle together after the frame members shall have been constructed the screen fabric is stretched over the inner smaller member 44 of the frame, and the larger outer frame member 45 is then fitted over the edges of the fabric, so as to embrace the inner frame member 44. (See Fig. 8.) It is only necessary to fasten the companion members and the fabric together by means of bolts 46, which pass through the parallel horizontal flanges of said members and the screen fabric. It will be observed that the rough or uneven edges of the screen fabric are clamped between the companion members of the frame, so as to be housed and concealed entirely within the frame, and that the sides of the riddle-frame are smooth and free from any projecting surfaces. This is an important feature in the construction of my improved riddle, because it enables the riddle to play or work freely within the sides of the threshing-machine casing 15, and the riddle is durable and strong in construction, so that it is not necessary to frequently repair the riddle in the course of its service during the threshing season. The riddle of my invention is intended to be connected detachably to the suspension-bails 39 40, with a view to facilitating its removal from or adjustment in the machine, and, as shown by Fig. 3, the vertical flanges of the companion frame members 44 45 are provided with notches 48 to receive the crossbars of the two suspending-bails 39 40. It is evident that the riddle may be adjusted within the bails for the notches 48 of the riddle-frame to engage with said bails, whereby the riddle is confined in position within the bails and is free to reciprocate therewith when the bail 40 is operated by the connections with the primary beater.

The straw and grain, after having been subjected to the action of the threshing cylinder and concave, are deposited directly upon an inclined endless conveyer 50. This conveyer extends longitudinally of the machine-casing, with its front end supported below the threshing-concave and its rear end in a position elevated above the shaking-riddle 38. The endless conveyer which I prefer to employ is similar to an analogous device common in this art—that is to say, the conveyer consists of an endless apron having a multiplicity of slats arranged to form pockets or cups of the exposed surfaces of the apron. An elevator of this type is advantageous in a threshing-machine of my invention, because the grain which is loosened from the straw by the action of the threshing-cylinder is free to lodge in the pockets or cups, while the straw rests on the surface of the slats forming a part of the conveyer, and the initial separation of the grain from the straw thus takes place immediately after the grain is subjected to the action of the threshing-cylinder. The lower front end of the inclined conveyer is supported by an idler-roller 49, which is journaled in suitable bearings within the casing 15, below the threshing-concave. The upper end of said inclined conveyer is fitted to a driving-roller 51, the shaft 52 of which is journaled in proper bearings on the machine-casing at a suitable distance above the shaking-riddle. Said shaft of the driving-roller is extended beyond the machine-casing 15, and to the said protruding ends of the shaft are secured the driving-wheels 53, which are adapted to engage frictionally with the driving-belts 24, that operate the threshing-cylinder, or said driving-wheels 53 may have frictional engagement directly with the master-wheels 23. It will be understood that the driving-roller 51 is propelled by the driving-wheels 53 in a direction to impel the inclined endless elevator to carry the grain and straw from the threshing-cylinder to a point above the shaking-riddle, and in connection with the inclined endless conveyer I employ two beaters, which operate to lift the straw and to agitate and loosen the grain at the delivery end of said conveyer. The primary rotary beater is carried by levers 54, which are loosely mounted on the protruding ends of the shaft 52 of the conveyer driving-roller, and these levers 54 are engaged with segments 55 on the frame 56 of the machine-casing 15, whereby the levers may be adjusted to raise or lower the primary beater 57. The shaft of this primary beater is journaled in suitable bearings secured directly to the levers 54, as shown by Fig. 3, and in the preferred construction of this beater I employ two heads, which are secured firmly to the beater-shaft and are joined together by means of horizontal bars, which constitute the effective or working surface of the beater 57. Said beater is designed to be driven by positive gear connections with the shaft 52 of the driving-roller for the inclined conveyer, and, as represented by Figs. 1 and 2, this beater-shaft is provided with gear-wheels 58$^a$, which intermesh directly with gears 58, secured to the shaft 52 of the driving-roller. In connection with the endless conveyer and the primary beater 57 I employ an auxiliary beater 59, the diameter of which is less than that of the primary beater. This auxiliary beater 59 is arranged directly over the delivery end of the inclined conveyer, where it passes around the driving-roller 51, and said auxiliary beater is geared, as at 60, to the primary beater, in order to be propelled thereby and to rotate in the reverse direction. The auxiliary beater is journaled on the levers 54 in a similar manner to the primary beater, as shown by Fig. 10, so that both beaters may be adjusted by the lever, and they are thereby maintained in proper relation to each other, so that they may be geared together in the manner described for the two beaters to rotate in opposite directions under all positions in the adjustment of the levers. In operation of the threshing-machine the grain which is contained in the cups or pockets of the inclined elevator is designed to be discharged from the elevator directly upon the riddle, while the straw which lodges on the slats of said conveyer is engaged by the auxiliary beater 59, so as to elevate the straw from the conveyer 50 and transfer said straw over and upon the primary beater. This primary beater deflects the straw in a direction toward the riddle, and the straw when acted upon by the primary beater is loosened and agitated, so as to free any grain which may have a tendency to adhere to the straw. It will thus be understood that the grain is delivered directly by the elevator toward the shaking-riddle in a manner to be exposed to the blast of air from the riddle-fan, while the straw is loosened by the primary beater in a manner to permit the air-blast to pass through the straw, whereby the grain and straw are subjected to a winnowing action from the blasts of the riddle-fan.

The primary beater 57, in addition to propelling the auxiliary beater, also serves to drive the rear bail 40 for the shaking-riddle, and this is effected by the employment of pitmen 61, which have wrist-pin connections with the gears 58$^a$ on the shaft of said primary beater, said pitmen being connected pivotally and adjustably to the arms 42 of the rear riddle-bail 40. (See Fig. 1.)

One of the important features of my threshing-machine consists in the employment of wind-deflectors 62 63 in active relation to the casing of the riddle-fan and the suspended shaking-riddle, and these deflectors are arranged to form a throat or space 64 for the passage of the blast from said riddle-fan to the front end of the shaking-riddle. The deflectors 62 63 each consist of a length of pliable material, preferably sheet metal, and said deflectors are supported adjustably within the machine-casing 15, in order to present curved surfaces of varying convexity and concavity, whereby the area and contour of the throat 64 may be varied in order to control the direction and energy of the blast from said riddle-fan. Referring more particularly to Figs. 2 and 3 of the drawings, it will be seen that the pliable wind-deflector 62 has adjustable connection with the machine-casing 15 at three several points, and said deflector 62 has its upper end disposed in front of and contiguous to the shaking-riddle 38, while the lower end of said deflector overlaps the upper edge of the riddle-fan casing. The upper edge of the deflector 62 is provided with a threaded bolt 64$^a$, that passes through a slot 65 and receives a clamping-nut 66 on each side of the machine, whereby the upper edge of said deflector 62 is adjustable with relation to the horizontal plane of the shaking-riddle. The lower edge of this deflector 62 is likewise provided on each side of the machine with a threaded bolt 67, which passes through a slot 68 in the machine-casing, and this threaded bolt receives a clamping-nut 69, which is adapted to bind against the machine-casing in order to confine the lower edge of the deflector in fixed, but adjustable, relation to the fan-casing, which it overlaps. (See Fig. 3.) The deflector 62 is furthermore provided at a point intermediate its length with a bolt 70 on each side thereof, each bolt 70 passing through a slot 71 and receiving a nut 72. By reference to Fig. 3 it will be observed that the lower part of the deflector 62 presents a convex surface to the throat 64, while the upper part of this deflector is arranged to present a concave surface opposite to the front end of the shaking-riddle. The described adjustable connections of this deflector to the machine-casing 15 provide for variation in the concavity and convexity of the front deflector—that is to say, the bolt 70 may remain in a fixed position, while either of the bolts 64$^a$ or 67 may be adjusted in their slots to change the contour of the deflector. It is evident that with the bolt 70 in a fixed position the upper bolt 64$^a$ may be raised or lowered to vary the concavity of the upper part of the deflector relatively to the shaking-riddle, or the lower bolt 67 may be adjusted in its slots 68 to change the convexity of the lower part of the deflector relatively to the fan-casing and intermediate baffle 79. This baffle 79 is arranged in the throat 64, which is formed by and between the deflectors 62 63, said baffle lying below the front end of the shaking-riddle. As shown more clearly by Fig. 3, the baffle 79 consists of a rod which is supported in the sides of the machine-casing and a plate which is made fast to the rod and extends therefrom in a direction toward the riddle-fan. The other deflector 63 forms one wall of the throat 64 and is arranged between the casing of the riddle-fan and the screen conveyer or auger that delivers the grain out of the machine, and this deflector 63 is supported to present a convex wall on the lower rear side of the wind-throat 64. The deflector 63 is provided at a point below the shaking-riddle with bolts 73, which pass through slots 74 in the machine-casing to receive the nuts 75, which are adapted to bind against said casing in order to confine the upper part of said deflector 63 in position. The lower edge of the flexible deflector 63 is arranged to overlap the lower edge of the casing of the riddle-fan, and to this part of the deflector is secured the bolts 76, which pass through the slots 77 and receive the clamping-nuts 78, which bind against the casing 15 in order to hold the lower edge of said deflector in proper position. It will be understood that the deflector 63 may be adjusted at either its upper or lower parts to vary the convexity of the deflector with relation to the intermediate baffle 79 and also enlarge or diminish the space between said baffle and the deflector.

From the foregoing description, viewed in connection, more particularly, with Fig. 3, it will be understood that I have provided pliable deflectors on opposite sides of an intermediate baffle and arranged to form a throat which leads from the casing of the riddle-fan to the shaking-riddle, and these deflectors may be adjusted independently or conjointly, in order to vary the cross-sectional area of the throat, for the purpose of controlling the energy of the blast from the riddle-fans. It is well understood by those skilled in the art that the blast, under pressure from the fan or blower, will follow or adhere to the contour of the surface of the conduit provided for the transit of the blast, and this principle is rendered valuable in my machine for the purpose of winnowing the grain as it is delivered by the endless conveyer to the shaking-riddle. It is my purpose to control and direct the energy and course of the blast from the riddle-fan in a manner to thoroughly eliminate the chaff and straw from the grain as it falls upon the riddle and also to direct the blast against the straw in a manner to prevent the chaff and straw from lodging upon the riddle, whereby the straw and chaff delivered from the endless conveyer and loosened by the action of the beater are held in suspension by the energy of the blast above the riddle, so that the blast will carry the straw through the wind-trunk to the stacker-tube and without permitting the straw or chaff to lodge upon the riddle. The control not only of the strength or energy of the blast, but its direction with relation to the riddle, is effected by the employment of the deflectors, arranged in the manner shown and described with relation to the riddle and the intermediate baffle 79, and special stress is laid upon these pliable wind-deflectors, together with the means for adjusting each deflector in a manner to vary the concavity or convexity of the deflector relatively to the intermediate baffle and the shaking-riddle. By my improvement in this blast-controlling mechanism I am able to subject the grain to a winnowing action in a manner to eliminate the chaff from the falling grain and prevent the lodgment of the grain in a mass or its accumulation in a heap on the shaking-riddle, the vibratory play or movement of which riddle serves to distribute the grain rapidly and freely, because the chaff is not permitted to lodge with the grain upon the riddle. The grain-auger or screw conveyer 80 is arranged in a horizontal position below the shaking-riddle, and the casing 81 of said auger or conveyer is arranged to partly surround the same. This casing may be formed by extending the outer edge of the deflector 63 to and below the auger by the conveyer 80, as shown by Fig. 3. The tailings-auger 82 is arranged in a horizontal position parallel to the grain-conveyer 80, and the casing 83 of said tailings-auger is joined to the casing 81 of the grain-auger. The tailings-auger 82 delivers the straw and grain which may escape from the shaking-riddle into the tailings-elevator 84, which is arranged on each side of the threshing-machine and extends from its rear end toward the front end or mouth of said machine. The tailings-elevator is indicated by dotted and full lines in Fig. 1 of the drawings, and the elevator proper is fitted to the shaft of the band-cutter cylinder, which will be hereinafter described. No novelty, however, is claimed for the tailings-elevator, its screw conveyer 82, or the grain conveyer or auger 80, because these features are ordinary in the art, in view of which I do not consider it necessary to more particularly describe these elements.

My machine is equipped with a pneumatic stacker-tube 85, the lower end of which is fitted loosely to the contracted rear end 37 of the wind-trunk 36 in a manner to permit the stacker-tube to be raised or lowered and adjusted horizontally thereon for a limited distance. Said lower end of the stacker-tube is connected by a universal joint or knuckle 86 to a part of the machine-casing 15 in order to provide for the horizontal and vertical adjustments heretofore described for the stacker-tube. To this stacker-tube is secured an elevating-cable 87, which passes over a horizontal sheave 88 on a vertical frame 89, secured to the machine-casing 15, and the end of said elevating-cable is connected to a suitable windlass, (indicated at 90.) A cable for adjusting the stacker-tube in a horizontal plane is indicated at 91, and it is wrapped or coiled one or more times around a pulley 92. The strands or lengths of the cable 91 are guided in a cross-bar 93, which is attached to the frame 89, and the ends of said adjusting-cable 91 are fastened to the stacker-tube, so that an adjustment of the pulley 92 in one direction will swing the stacker-tube in a corresponding direction; but a reverse adjustment of this pulley 92 operates to pull the other strand of the cable, and thereby move the stacker-tube in the opposite direction.

I will now proceed to describe the mechanism by which the grain may be fed to the mouth of the threshing-machine and to effect the loading of the grain from the ground into the feeder mechanism. This feeder is constructed with a frame 95, which forms a part of the derrick or truck of the feeder, and said frame is supported by wheeled axles 96, which are suitably connected to the frame to provide for its convenient transportation. The derrick or truck of the feeder-frame is provided with a wide bearing-rail or bottom 97, (see Figs. 3, 4, and 5,) and said derrick or truck 95 furthermore carries an overhead elevated frame 98, which supports the sheaves 99, that are adapted to direct the fork-cables 100 101. Each fork-cable is attached at one end to a grain-fork 102 of any suitable construction, and, as will hereinafter appear, the cables 100 101 are associated with independent spools, by which the cables may be controlled separately, so that one cable may be lowered for its fork to be loaded with grain, while the other cable is drawn in by its spool for the purpose of elevating the fork and suspending the latter, with its load, over the derrick or truck 95.

On the casing 15 of the threshing-machine, near the front end thereof, is erected a frame 103, and on this frame is hung or fulcrumed a pair of levers 104. These levers are provided with journal-bearings, as shown by Figs. 3 and 6, for the reception of a shaft $104^a$, that serves to support and operate the spools by which the fork-cables are manipulated. The driving-shaft $104^a$ of the fork mechanism is thus supported directly on the levers, so as to be adjustable therewith, and the free ends of said levers are adapted to engage with segments 105, which are fastened on uprights 106 of the casing 15. The levers 104 may be engaged with the segments 105 to raise the driving-shaft $104^a$ to elevated position, where its driving-wheels 107 will be free from engagement with the belts 24, that propel the threshing-cylinder, thereby throwing the shaft of the fork mechanism out of gear with the driving-belts. Said wheels 107 are secured firmly to the ends of the fork-driving shaft $104^a$, and these wheels are of large diameter, so that they may be engaged frictionally with the cylinder-driving belts 24. It will be understood that the levers 104 may be depressed to lower the shaft $104^a$ for the wheels 107 to engage frictionally with the belts 24, and thereby drive the fork-controlling shaft, and when these levers are thus lowered they may be engaged with segments 105 in order to maintain the several parts in position to be driven by the wheels 107. These driving-wheels serve a twofold purpose—that is to say, they engage with the driving-belts 24 at a point adjacent to the pulleys on the cylinder-shaft, so that the driving-belts will be maintained in a taut condition in order to secure maximum efficiency, and at the same time the wheels 107 are rotated by frictional contact with the belts for the purpose of propelling the shaft $104^a$. This shaft carries two spools, (indicated at 108 109 in Fig. 6 of the drawings,) each spool being mounted loosely on the shaft to rotate freely thereon when its clutch is adjusted to uncouple said spool from the shaft. Each spool is constructed at one end for engagement by a friction-clutch 110, which is controlled by a lever 111, mounted or fulcrumed on the frame or uprights 103, and the levers of the two clutches 110 are adapted to be operated separately, in order that one clutch may make its spool fast with the shaft $104^a$ when the other clutch is adjusted to release its spool from engagement with said shaft. Each spool is furthermore provided with a brake-disk 112, which is engaged by a band or shoe 113, controlled by a foot-treadle $113^a$. It will be understood that each spool is equipped with a brake mechanism which is independent of like mechanism for the other spool, and in the practical construction of my apparatus the levers 111 for the two clutches of the spools and the treadles $113^a$ for the brakes of the two spools will be arranged on the casing 15, substantially as indicated by Fig. 3, in order that a single operator, who may be seated on the machine, may control the levers 104, the levers 111, and the treadles $113^a$, all these parts being within easy access of the attendant. It is also designed to have the adjusting-pulley and the windlass for controlling the stacker-tube within convenient reach of the attendant.

I would have it understood that I do not confine myself to the use of any particular type of clutch or of brake for controlling each spool that operates one of the fork-cables, because I am aware that these elements may be modified within wide limits by a skilled constructor.

From the foregoing description it will be understood that each spool for one fork-cable may be clutched fast with the shaft $104^a$ and unclutched therefrom independently of the other spool and that each spool when released from the shaft may be controlled by its brake. This is an important feature of the fork mechanism, because it enables each spool to be clutched to the shaft $104^a$ to rotate therewith and coil the fork-cable on said spool in order to raise the fork with the load of grain in a suspended position over the derrick of the feeder. When the fork, with its load, arrives at a proper position over the feeder-conveyer, the operator should manipulate the clutch to release the spool from the shaft, and the brake-shoe may then be manipulated in order to arrest the rotation of the spool and prevent the uncoiling of the fork-cable until the fork assumes a position where it will properly adjust the load of grain upon the feeder-conveyer, after which the tension of the brake on the spool may be eased in order to allow the spool to rotate idly on the shaft and permit the fork-cable to uncoil from the spool, so that the fork with its load may descend by gravity to a position adjacent to the feeder-conveyer, thus enabling the fork to be controlled to deposit its load with precision and accuracy on the feeder-conveyer.

The endless feeder-conveyer 114 is shown by Fig. 4 in the form of an apron provided with a series of slats, and this conveyer is supported by a wheeled frame 115, which is mounted within the derrick or truck frame 95, so as to be adjustable in any direction therein. The feeder-frame 115 is provided at its opposite ends with caster-wheels, or, as they may be termed, "pivot-wheels," 116, and said wheels are properly connected to the feeder-frame, so as to turn in horizontal planes, for the purpose of securing an adjustment of the feeder-frame longitudinally and transversely of the derrick or truck frame. The adjustable wheeled frame 115, which carries the traveling endless conveyer, is provided at the end contiguous to the threshing-machine with an inclined adjustable section 117, which is pivotally connected to the horizontal length of the wheeled frame 115 at the point where an idler-roller 118 is journaled in the horizontal length of said frame 115, said idler-roller 118 being arranged between the upper and lower lengths of the endless slatted conveyer 114 in order to act against said lower length of the conveyer to hold the same in its proper relation to the horizontal and inclined members 115 117 of the wheeled feeder-frame. This inclined length of the feeder-frame may be adjusted in a vertical direction by means of a lever 119, which is fulcrumed at 120 on a part of the adjustable frame 115, and one end of this lever is suitably connected to the adjustable inclined length 117 of said frame, while its other end is adapted to engage with a rack or segment 121, attached to the end of the frame 115 adjacent to one of the pivot or caster wheels, all as clearly shown by Fig. 4 of the drawings. The wheeled frame, which carries the endless conveyer, also sustains all of the operative elements which are associated with the endless feeder-conveyer, and one of these elements is a tightener-wheel 122, which is adjustably supported in journal-bearings on uprights which are attached to the frame 115. (See Fig. 1.) The tightener-wheel is adapted to ride against the endless traveling feeder-conveyer at a point substantially over the idler-roller 118, and said tightener-roller engages with the upper length of the endless conveyer in order to maintain the latter in its proper relation to the horizontal and inclined members of the wheeled conveyer-frame. I employ a pair of levers 123 to support a band-cutter and spreader cylinder in active relation to the inclined length of the endless feeder-conveyer. These levers 123 are hung loosely on a shaft 124, which is supported in a pair of posts 125, that are attached to the wheeled conveyer-frame 115, and said levers 123 are provided with journal-bearings to receive the shaft of the spreader-cylinder 126. The free ends of the levers 123 are adapted to engage with segments 126$^a$, which are fastened to the posts 115, which suspend the shaft of the tightener-wheel 122, said posts 115 being also fastened to the horizontal length of the adjustable feeder-frame 115.

The endless feeder-conveyer 114 passes continuously along the horizontal frame 115 and the inclined section 117, and at one end this endless feeder-conveyer passes around an idler-roller 129, which is journaled in the sides of the frame 115. (See Figs. 1 and 4.) The other end of the endless feeder-conveyer, which passes along the inclined length 117 of the adjustable frame, is arranged around the driving-roller 130, which is journaled in suitable bearings at the upper end of the inclined length 117 of the frame, and on the ends of the shaft of this driving-roller 130 are secured gears 131, which are adapted to mesh directly with gear-pinions 132 on the shaft of the threshing-cylinder, whereby the roller 130 for the endless feeder-conveyer is geared directly to the threshing-cylinder in order that said cylinder may propel the feeder-conveyer.

Within the cap or housing of the threshing-machine, at the front or mouth end thereof and above the horizontal plane of the threshing-cylinder, is arranged a cylinder 132$^a$, the shaft of which is journaled in suitable bearings provided on the casing 15 of the threshing-machine. The ends of the shaft for the cylinder are extended beyond the casing 15 to receive the gears 133, which are arranged to mesh directly with the gears 131 on the shaft of the driving-roller 130, and it will therefore be seen that the threshing-cylinder shaft is adapted to rotate the driving-roller 130 and the cylinder 132 through the described train of gearing. The shaft 124, which serves as a fulcrum for the levers 123, is provided with gears 134, which are arranged to mesh with the gears 131 on the driving-roller of the feeder-conveyer, and these gears 134 intermesh with gears 135 on the shaft of the spreader-cylinder 126, so that the driving-roller 130 operates through the gears 134 and 135 to rotate the spreader-cylinder. It will be understood that the band-cutter and spreader cylinder 126 is provided with teeth arranged to engage with the straw as it is carried in an upward direction by the inclined section of the endless feeder-conveyer, and said cylinder thus serves to cut the bands and to loosen the straw before it is delivered by the feeder-conveyer to the threshing-cylinder. The cylinder 132 is also provided with teeth or knives, which are adapted to sever any bands on the sheaves or shocks of wheat or other grain which may remain uncut after the grain passes the cylinder 126, which grain is to be fed to the threshing-cylinder, and this cylinder 132 also serves to compact or compress the grain as it is delivered over the end of the feeder-conveyer to the threshing-cylinder. Said cylinder also prevents the grain from passing in an upward direction between itself and the cap or housing of the threshing-machine, and the grain is thus adapted to be properly fed to the threshing-machine.

It will be understood that the truck or derrick which carries the feeder is a separate structure from the threshing-machine, and in transporting the apparatus from one place to another the threshing-machine is hauled or drawn separately from the derrick or truck. It frequently occurs that the threshing-machine occupies an elevated or depressed position with relation to the feeder apparatus, or, vice versa, the end of the feeder apparatus may be depressed below or raised above the position assumed by the threshing-cylinder. Difficulty is also sometimes encountered in arranging the feeder apparatus in proper alinement with the mouth of the threshing-machine, and to overcome these difficulties I have constructed the feeder so that the wheeled frame for the endless feeder-conveyer may be adjusted transversely across the line of the threshing-machine, or it may be moved lengthwise of the threshing-machine, or the inclined section of the adjustable frame and the endless feeder-conveyer may be raised or lowered. It will therefore be understood that if the feeder-conveyer and its frame do not properly aline with the threshing-machine the entire feeder-conveyer may be moved laterally or transversely with respect to the threshing-machine in order to bring the feeder-conveyer in proper alinement therewith. At the same time the feeder-conveyer apparatus may be moved lengthwise within its derrick-table or truck, and the lever 119 may be manipulated to adjust the inclined length of the feeder-conveyer in order to bring its roller 130 into proper relation to the threshing-cylinder, so that the gears 131 on said shaft will properly mesh with the gears 132 on the threshing-cylinder shaft, said gears 131 also meshing with the gears on the shaft of the band-cutter cylinder and with the gears on the shaft 124, that propels the spreader-cylinder 126. The power necessary to operate the threshing-machine is applied or transmitted by any suitable mechanical appliances to the jack-wheels 23, thereby rotating the shaft 21, and these jack-wheels operate the belts which propel the threshing-cylinder. The drive-wheels on the driving-roller for the endless inclined conveyer are rotated by frictional contact with the jack-wheels, or the driving-belts and the fan-shafts are propelled by the spur-gearing with the jack-wheels. The driving-roller for the endless inclined conveyer, however, operates the primary beater, which in turn rotates the auxiliary beater and also reciprocates the rear bail for imparting the shaking motion to the suspended riddle. The operator, seated on the deck of the threshing-machine, is able to control the shaft 104$^a$ by means of the levers, so that the driving-wheels on said shaft 104$^a$ may thus be rotated. In loading the grain on the feeder apparatus the forks are allowed to descend in order to obtain the load of grain, and the operator then manipulates one of the clutches 110 to make the spool fast with the shaft 104$^a$, thereby elevating one fork and its load. The clutch is now elevated to release the spool from the shaft 104$^a$, and the brake is applied to control the spool in order to deposit the load of grain from the suspended fork upon the feeder-conveyer. The other fork may be operated and controlled in like manner, and the two forks may thus be used alternately or simultaneously in order to expeditiously load the feeder-conveyer with large quantities of grain. All of the several elements of the threshing-machine and the feeder apparatus work in unison from a single source of power embodied in the form of the jack-wheels, and the feeder-conveyer carries the grain from the derrick or truck table to the threshing-cylinder, the grain being subjected to the action of the spreader and band-cutter cylinders before it is deposited in the threshing-machine. The grain and straw are delivered from the threshing mechanism directly to the endless inclined conveyer, and the grain lodges or accumulates in the pockets or cups of said conveyer, while the straw rests on the surface of the conveyer-slats. The grain is delivered from this endless inclined conveyer below the auxiliary beater, so that it is thrown into the path of the blast from the riddle-fan, while at the same time the auxiliary beater lifts the straw from the delivery end of said inclined conveyer, so as to throw the straw over and upon the primary beater, which in turn depresses the straw toward the riddle and at the same time subjects it to a beating action to loosen any grain which may be contained therein. The grain is deposited upon the shaking-riddle and passes through the same into the casing of the grain-auger; but the straw and chaff are acted upon by the blast from the riddle-fan, so as to be held or maintained in suspension and prevented from lodging upon the riddle. The tailings are deposited in the screw conveyer of the return-elevator, and they are carried by said elevator back to the mouth of the threshing-machine. The straw and chaff which are blown into the wind-trunk by the action of the riddle-fan meet with the blast from the stacker-fan and are conveyed through the stacker-tube, said tube being adjustable in horizontal and vertical planes by the means heretofore described. The wind-deflectors 62 63, which are in operative relation to the riddle-fan, may be adjusted independently or in unison to vary the cross-sectional area of the wind-throat 64, which leads from the riddle-fan to the shaking-riddle. The deflector 62 may be adjusted toward the intermediate baffle and the other deflector 63 in a manner to vary its concavity or convexity, thus changing the contour of the wind-throat 64, and in like manner the deflector 63 may be adjusted toward the intermediate baffle to vary the convexity of the lower side of the wind-throat. The adjustment of these deflectors independently of each other or conjointly enables the attendant to control the energy or strength of the blast from the riddle-fan and also to change the contour of the wind-throat so as to regulate the places where the blast is delivered upon the shaking-riddle. This is advantageous, because the blast may be controlled in a very effectual manner to prevent lodgment of the grain in a mass upon the riddle and to properly act against the straw and chaff and to prevent the same from being deposited on the riddle, whereby the straw and chaff are thoroughly eliminated from the grain and carried into the stacker-tube.

In my feeder mechanism for delivery of grain to the threshing-cylinder the derrick-table or truck lies in a horizontal position and is open on its upper side throughout the entire length. The feeder-conveyer extends lengthwise of the open part of the derrick-table and occupies a position therein which adapts said conveyer to receive grain at any point in the length of the derrick-table. This enables the grain to be supplied rapidly and conveniently on the feeder-conveyer and the cylinder and dispenses with the services of a number of men to load the grain on the feeder.

No claim is herein made to the band-cutter and feeder mechanism shown and described in this application, because the right is reserved to file a separate application for said band-cutter and feeder mechanism.

I prefer to have the grain-auger extend beyond one or both sides of the machine and to associate with the auger sacking device or devices, which permit the grain to be delivered by the auger directly to the sacking device without elevation.

Changes in the form, proportion, size, and the minor details of construction within the scope of the appended claims may be resorted to without departing from the spirit or sacrificing any of the advantages of this invention.

What I claim is—

1. In a threshing-machine, the combination of a threshing-cylinder, the riddle and stacker fans having their shafts journaled in the same horizontal plane and provided with gear-pinions, a power-driven jack-wheel carried by a shaft mounted between, and independently of, the riddle and stacker fans and provided with a smooth belt-surface and with an internal gear with which meshes the gear-pinions on the shafts of the stacker and riddle fans, an endless elevator, a belt between the belt-surface of the jack-wheel and the threshing-cylinder shaft, and a friction drive-wheel fast with a shaft of said elevator and engaging frictionally with said belt directly over the jack-wheel, substantially as described.

2. In a threshing-machine, the combination with a riddle, and an endless inclined conveyer, of a primary beater arranged in rear of the delivery end of the conveyer, an auxiliary beater situated over the delivery end of the conveyer and in front of the primary beater, and a lever hung concentric with the delivery end of the conveyer and having both beaters journaled thereon for the purpose described, substantially as set forth.

3. In a threshing-machine, the combination with a riddle, an endless inclined conveyer, and a driving-roller therefor, of a primary beater situated over the riddle, contiguous to the delivery end of the conveyer, and geared to said driving-roller, an auxiliary beater situated between the primary beater and delivery end of the conveyer and geared directly to the primary beater to rotate in an opposite direction thereto, and means for adjusting the primary and auxiliary beaters simultaneously with relation to the conveyer, substantially as described.

4. In a threshing-machine, the combination with a riddle, and a blast-fan, of pliable deflectors in continuation of the fan-casing and forming a wind-throat to deliver a blast upon the riddle, one of said deflectors being supported and adjustable at points intermediate of its ends to vary the cross-sectional area and the contour of said throat, substantially as described.

5. In a threshing-machine, the combination with a riddle, and a blast-fan, of the deflectors forming a wind-throat in continuation of the fan-casing, one of said deflectors presenting concave and convex surfaces in front of the riddle and adjustable in relation to the other deflector to vary its contour and the cross-sectional area of the wind-throat, substantially as described.

6. In a threshing-machine, the combination with a riddle, and a blast-fan, of deflectors forming a wind-throat in continuation of the fan-casing, one of said deflectors being pliable and adjustably supported at different points along its length to maintain the deflector in position to present convex and concave surfaces, for the purpose described, substantially as set forth.

7. In a threshing-machine, the combination of a machine-casing having deflector-slots, a fan, a riddle, and the pliable adjustable deflectors forming a wind-throat in continuation of the casing, each pliable deflector having its ends provided with threaded stems, which pass through said slots and are held by clamping-nuts, whereby each deflector has its end portions slidably supported relative to the fan-casing and the plane of the riddle, to vary the curvature and cross-sectional area of the blast-passage, substantially as described.

8. In a threshing-machine, the combination with a riddle, and a blast-fan, of the deflectors forming a wind-throat in continuation of the fan-casing, one of said deflectors being pliable and presenting a convex surface to the other deflector, and said pliable deflector being slidably supported at its ends and at an intermediate portion to vary the cross-sectional area and the contour of said throat, substantially as described.

9. In a threshing-machine, the combination with a riddle, and a blast-fan, of the pliable curved deflectors forming a wind-throat in continuation of the fan-casing and each supported slidably with relation to the fan-casing and the riddle, each deflector being adjustable independently of the other and provided with means for clamping the same in place, substantially as described.

10. In a threshing-machine, the combination with a riddle, and a blast-fan, of the pliable curved deflectors forming a wind-throat in continuation of the fan-casing, and an intermediate baffle or divider arranged in said wind-throat each deflector being slidably confined at its end portions and pliable between the confining-points for adjustment laterally with relation to the baffle or divider, for the purpose described, substantially as set forth.

11. A flat riddle for threshing-machines comprising two metallic frame-sections, each having its bars right-angled in cross-section, thereby forming horizontal and vertical flanges, said sections being fitted one within the other, with their respective horizontal and vertical flanges opposed to each other, a screening material having its edges bent over the sides of the bars of the inner section, and rivets, connecting the horizontal flanges of the said sections together and clamping the edges of the screening material between the proximate sides of said frame-sections, substantially as described.

12. In a threshing-machine, a riddle-frame consisting of complemental members, each member formed of a cross-sectionally-angular metallic bar, one flange of which is slitted and the other flange is bent at intervals for the slitted flange to overlap the other flange at the corners of the frame member, one of said members being fitted one within the other to lie in the same plane thereof and having its flanges overlapped by corresponding flanges of the outer member, a foraminous material clamped between the angular lapping flanges of the companion members of said frame, and transverse fastenings uniting the two frame members and the foraminous material, substantially as described.

13. In a threshing-machine, the combination with a riddle-fan and the screw conveyers, of the adjustable pliable deflectors forming a wind-throat in continuation of the riddle-fan casing, one of said deflectors curved to form a housing for the screw conveyer, substantially as described.

In testimony that I claim the foregoing as my own I have hereto affixed my signature in the presence of two witnesses.

CHARLES ALBERT LONG.

Witnesses:
JOHN H. SIGGERS,
W. PERRY HAHN.